June 26, 1951  L. B. NEIGHBOUR ET AL  2,558,266
ATTACHMENT COUPLING FOR VEHICLE ACCESSORIES
Filed Nov. 21, 1947
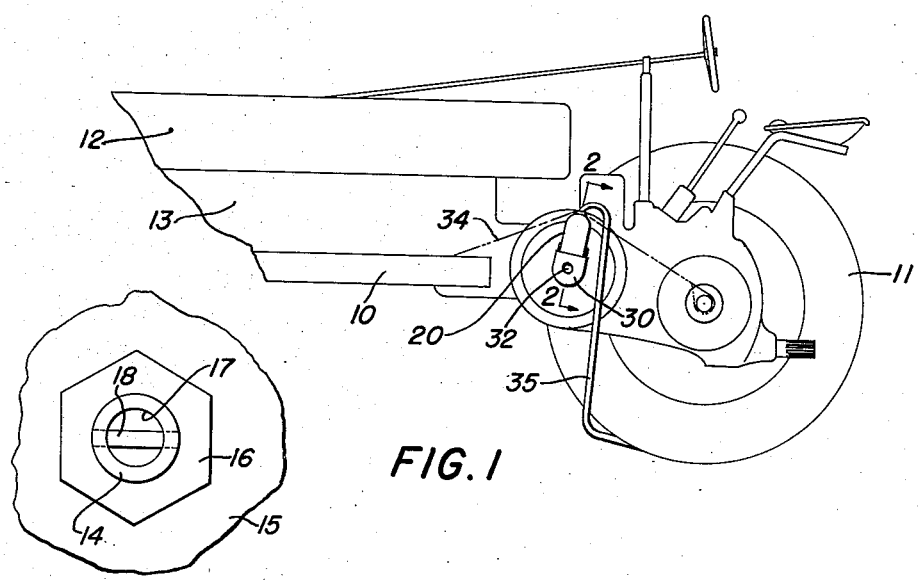
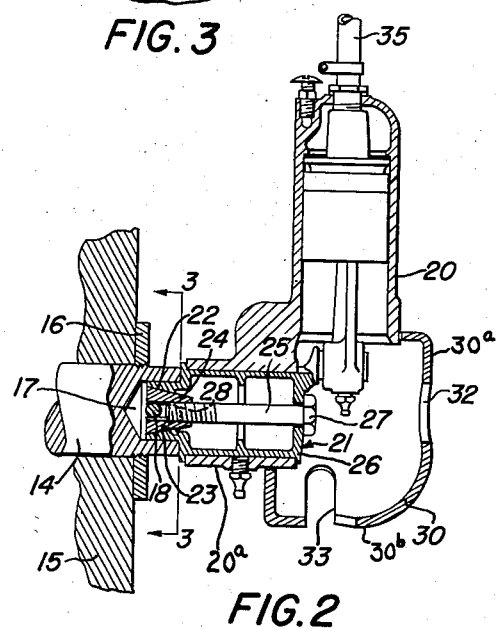
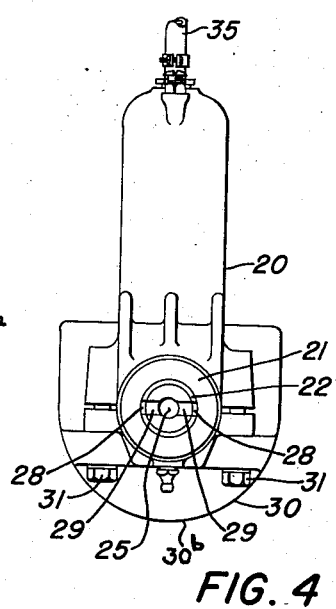
WITNESS:
*Ralph H Morgan*
INVENTORS
LEONARD B. NEIGHBOUR &
WAYNE W. KELLUMS
BY
ATTORNEYS Patented June 26, 1951

2,558,266

UNITED STATES PATENT OFFICE 2,558,266

ATTACHMENT COUPLING FOR VEHICLE ACCESSORIES

Leonard B. Neighbour, Moline, and Wayne W. Kellums, Silvis, Ill., assignors to Deere & Company, Moline, Ill., a corporation of Illinois Application November 21, 1947, Serial No. 787,282

4 Claims. (Cl. 74—15.63)

This invention relates to a coupling means and more particularly to an attachment coupling for attaching or coupling an accessory to a vehicle. More particularly, the invention relates to an adapter attachment for use with a vehicle tire pump of the type shown in U. S. Patents Nos. 2,265,971, 2,299,879 and 2,413,775.

The primary purpose of the invention is to provide an improvement in the attaching means for a tire pump or the like which is used for the purpose of inflating pneumatic tires on vehicles, particularly agricultural tractors and allied equipment. The importance of the provision of pumps of this type is adequately set forth in U. S. Patent 2,265,971, referred to above. In order that a pump of this type may be made available for the greatest number of potential users, it is necessary that the adaptability thereof be made as nearly universal as possible, so that a basic pump may, by the use of simple adapters, be used with almost any kind of vehicle, regardless of the source of power on the vehicle.

The pumps shown in U. S. Patents Nos. 2,265,971 and 2,299,879 are primarily adapted for use with the power take-off shaft of the agricultural tractor. In many cases, however, the power take-off shaft of the tractor is currently being utilized for some other purpose and is not readily available for the attachment thereto of a pump or like accessory. In one well-known type of tractor another power source is available; that is, the engine structure peculiar to this type of tractor provides a transverse crankshaft with a flywheel at one end thereof which is disposed at one side of the tractor. Ordinarily the hub of the flywheel is provided with means for receiving a starting crank whereby the engine may be manually cranked.

A tractor having an engine structure of the type referred to is shown in U. S. Patent 2,413,775. According to that patent the adapter for the pump is bolted directly to an outer base portion of the hub of the flywheel. The improvement that characterizes the present invention provides for connection of the pump directly to the means normally used for inserting a cranking element for cranking the engine by means of the end of the crankshaft available at the outer face of the flywheel, and in this respect the present invention provides a considerable advance over the structure shown in the patent last referred to.

It is therefore a principal object of the present invention to provide improved means for connecting an accessory to a tractor or like vehicle. More specifically, it is an object to provide a coupling for connecting a pump or like accessory to a power source on the vehicle that is readily available. In this respect it is a feature of the invention to provide a coupling that is adaptable to such power source without any changes in the vehicle power source and more specifically without any major changes in the basic type of accessory, whereby the manufacturer is enabled to supply a basic type of pump including several coupling adapters so that the pump may be made to fit any of the several types of tractors now in use. Other objects of the invention include: the provision of a coupling including a radially expansible connection; the provision of means for expanding the extension, and specifically a tapered member axially movable in the extension for the purpose of radially expanding the extension; to provide a simple screw and thread means for moving the tapered member axially to expand the extension; and to provide a movable cover on the accessory having an opening or openings therein providing for access to the screw thread means.

The foregoing and other desirable objects and important features of the invention will become apparent as the disclosure is more fully made in the following detailed description, taken in conjunction with the accompanying sheet of drawings wherein there is shown, by way of example, a preferred form of the invention.

In the drawings:

Figure 1 is a fragmentary side elevational view, largely schematic, showing the use of a tire pump with a tractor of a well known type;

Figure 2 is an enlarged cross sectional view taken substantially on the line 2—2 of Figure 1 and showing the pump in place and the connection between the pump and the engine crankshaft;

Figure 3 is a face view of the hub portion of the flywheel and crankshaft, as viewed along the line 3—3 of Figure 2, assuming that the pump attachment has been removed from the flywheel; and Figure 4 is a view of the pump per se, showing the inner face thereof as removed from the crankshaft and flywheel.

With respect to the illustration and the detailed description to follow, it should be understood that reference is had to an ideal form of the invention constructed according to current requirements, and cognizance should be taken of the fact that this construction is susceptible of many modifications and alterations without departure from the basic principles of the invention.

The vehicle chosen for the purposes of illustration is an agricultural tractor of a well known type having a longitudinal body 10 carried on a transverse rear axle structure including traction wheels 11, only one of which appears in the drawing. The body 10 includes a fuel tank and hood structure 12 which overlies an internal combustion engine 13 of the type having its crankshaft transverse to the longitudinal axis of the tractor. The crankshaft is designated by the numeral 14 (Figures 2 and 3) and carries at one end thereof at one side of the tractor a flywheel 15. The flywheel and crankshaft structure is shown as including a nut 16 threaded onto the crankshaft for retaining the flywheel 15 in place.

The outer end of the crankshaft 14 at the flywheel end thereof is provided with an axially outwardly opening recess 17 preferably cylindrical in shape. The interior of the recess provides the flywheel and crankshaft assembly with a driving portion in the form of a driving lug provided by a transverse pin 18 extending diametrically across the recess 17 and carried at its opposite ends in wall portions of the outer ends of the crankshaft 14.

The detailed construction of the pump is shown in any one of the patents mentioned above and no reference will be made to the operating parts thereof except in so far as such parts are pertinent to the present invention. In general, the pump includes a support or casting 20 which provides a cylinder for a reciprocating piston driven by and eccentric on a rotary member 21, the casting further including a hollow bearing 20ª for journaling the rotary member. In the adaptation of the pump to the vehicle, as shown in the present preferred illustration, the pump is arranged with respect to the flywheel and crankshaft assembly so that the rotary member 21 and the crankshaft 14 are coaxial. The rotary member is provided at one end with an axial extension in the form of a sleeve or hollow shaft 22, here shown as being formed integral with the rotary member. The sleeve may, of course, be otherwise secured to the rotary member for rotation therewith. The sleeve is of such size and shape as to be insertable within the recess 17 in the end of the crankshaft and flywheel assembly. The interior of the sleeve is tapered or provided as a section of a cone, as designated at 23, and receives therein an expanding element in the form of a tapered plug 24 axially drilled and threaded to receive a screw threaded element 25 in the form of a bolt which extends axially through the rotary member 21 and through an apertured wall 26 therein, the bolt including a head 27 for receiving a wrench by means of which the bolt may be propelled into and out of the threaded plug 24.

The sleeve 22 is provided with diametrically opposed generally axially extending slots 28 which provide driving portions or lugs engageable with the driving lug or pin 18 of the crankshaft and flywheel assembly. The slots 28 additionally provide flexibility in the sleeve 22 whereby the sleeve may be expanded radially outwardly into engagement with the interior portion of the crankshaft as provided by the recess 17. The radial expansion of the proximate end of the sleeve 22 occurs when the bolt 25 is tightened to draw the threaded plug 24 toward the interior of the rotary member 21.

The end of the plug 24 that is proximate to the slotted end of the sleeve 22 is itself provided with a pair of diametrically opposed slots 29. These slots provide the plug with driving portions or lugs also engageable with the driving lug or pin 18 of the crankshaft and flywheel assembly, whereby all three parts, including the crankshaft 14, rotary member 21 and plug 24, are drivingly interconnected for rotation together when the sleeve 22 is insertable into the recess 17.

As stated above another feature of the invention is the provision of a movable cover or housing for enclosing the eccentric end of the rotary member 21. This cover is designated in the drawing by the numeral 30 and is shown as being removably attached to the casting 20 by means of a pair of cap screws 31. The cover 30 is provided at its outer face with a wall 30ª disposed radially as respects the bearing 20ª, which wall has an opening 32 disposed substantially on a continuation of the axis of the bolt 25. This opening provides for the insertion of a socket wrench or similar tool for the purpose of turning the bolt 25. The cover includes at its bottom a wall 30ᵇ which is circumferential as respects the bearing 20ª and which has a second opening 33 through which a different type of wrench may be inserted for engagement with the head 27 of the bolt for propelling the bolt. The entire cover may be removed for access to the interior of the lower portion of the casting 20.

The following description pertains to parts not specifically concerned with the present invention and reference is had thereto only for the purpose of explaining the functions thereof in connection with the background disclosure. After the pump is secured to the flywheel and crankshaft assembly by means of the sleeve extension 22, a flexible means in the form of a chain 34 is connected between the pump and a pair of spaced apart points on the tractor body. The details of this type of attachment are disclosed in Patent No. 2,413,775, referred to above. The pump includes an air hose 35 for connection to the valve of the pneumatic tire on the traction wheels 11.

What is claimed is:

1. In an accessory for use with a vehicle wherein the vehicle includes a rotatable output member having an outwardly opening recess on the axis of rotation thereof and providing an interior wall in the member, and wherein the accessory includes a rotary driven member: means for coupling the output and driven members together in axial alignment, comprising a radially expansible sleeve secured to the driven member for rotation therewith and insertable into the recess in the output member; an expanding element carried within the sleeve; means respectively on the output member, the driven member, and the expanding element, providing complementary lug portions interengageable when the sleeve carrying the expanding element, is inserted into the recess; and means for causing the element to expand the sleeve radially into driving engagement with the interior wall of the output member.

2. For use with a tractor having an engine-driven shaft provided with an axially recessed end portion including internal lug means disposed diametrically across the recess wherein the recess and lug means receive cooperating portions on a starting crank: an accessory other than such starting crank, comprising a shaft element positionable in axial alinement with the engine-driven shaft and received within the recess and having lug means engageable with the lug means on the engine-driven shaft; and means for securing the shafts together, including lug means engageable with the lug means on the engine-driven shaft.

3. In an accessory for use with a vehicle wherein the vehicle includes a rotatable output member having an outwardly opening recess on the axis of rotation thereof and an internal driving lug, and wherein the accessory includes a rotary driven member: means for coupling the output and driven members together in axial alinement, comprising a radially expansible sleeve split to provide a longitudinal slot and secured to the driven member for rotation therewith and insertable into the recess in the output member with the slot receiving the driving lug; an expanding element carried within the sleeve; and means for causing the element to expand the sleeve radially outwardly into driving engagement with the output member.

4. An accessory for use with a vehicle having a rotatable output member including a drive element thereon, comprising: a support having fixed thereto a portion including a hollow bearing adapted for disposition coaxially with and to extend axially outwardly from the output member and further having an enlarged housing portion fixed to the bearing portion and disposed axially outwardly thereof and including a pair of walls, one of which is disposed radially as respects the bearing portion and the other of which is disposed circumferentially as respects the bearing portion; a coaxial driven member journaled in the bearing portion and having an inner end portion provided with means for driving engagement with the output drive element and further having an outer portion within the housing portion and spaced axially and radially inwardly, respectively, of the radial and circumferential walls; means projecting through the driven member for effecting driving engagement between the output drive element and the inner end portion of the driven member and having a controllable part at the outer portion of said driven member and within said walls; and each of said walls having an opening therein alined with the controllable part and through either of which a tool may be inserted for controlling said part.

LEONARD B. NEIGHBOUR.
WAYNE W. KELLUMS.

REFERENCES CITED

The following references are of record in the file of this patent:

UNITED STATES PATENTS

| Number | Name | Date |
|---|---|---|
| 658,624 | Egger | Sept. 25, 1900 |
| 1,295,991 | Kellogg | Mar. 4, 1919 |
| 1,315,256 | Strickland | Sept. 9, 1919 |
| 1,379,784 | Schwartz | May 31, 1921 |
| 1,871,839 | Carter | Aug. 16, 1932 |
| 2,252,938 | Lord | Aug. 19, 1941 |

FOREIGN PATENTS

| Number | Country | Date |
|---|---|---|
| 169,455 | Great Britain | Dec. 21, 1922 |